Patented July 4, 1939

2,164,587

UNITED STATES PATENT OFFICE 2,164,587

METHOD OF PRODUCING AMINES

Ralph H. McKee, New York, N. Y., and Carl T. Bahner, Conway, Ark.

No Drawing. Application February 26, 1937, Serial No. 127,870

18 Claims. (Cl. 260—501)

The present invention relates to an improved process of producing amines, and, more particularly, to a process of producing amines in hydrotropic solution.

The art has known that ethylene dichloride reacts with ammonia on heating to produce ethylene diamine which then reacts with more of the organic halide to form by-products, such as diethylene triamine and triethylene tetramine. For the purpose of counteracting this disadvantage a large excess of ammonia is used, but even so the yield of ethylene diamine is very low. Thus, Lauter in U. S. Patent No. 2,020,690 has stated that by using six to twenty times the theoretical quantity of ammonia per mol of ethylene dichloride, only 18 to 20 percent of the theoretical yield is obtained. Other proposals have been made including those by Curme and Lommen in U. S. Patent No. 1,832,534, by Bersworth in U. S. Patent No. 2,028,041, and by Lauter in U. S. Patent No. 2,020,690.

It has been recognized for some time that in the conventional processes for the production of the lower aliphatic or aromatic amines from the halide or dihalides of the hydrocarbons and aqua ammonia, the reaction has taken place in a two phase system. This has been caused by the low solubility of the organic halides in aqueous solutions. Attempts have been made to overcome this as well as other disadvantages. As far as we are aware none of the attempts has been wholly successful when put into operation on an industrial scale to produce commercially acceptable products.

We have discovered a process by which disadvantages and shortcomings of the prior art processes are overcome and by which the operating efficiency is increased above prior art methods.

It is an object of the present invention to provide a method whereby amines may be formed from the halides of the hydrocarbons and substituted hydrocarbons by reacting these halides with ammonia in a substantially one phase liquid system.

It is a further object of the present invention to carry out the ammonolysis of halides of the alkyls, alkylenes and aryls in a hydrotropic solution.

Other objects and advantages will become apparent from the following description of a preferred embodiment of the invention.

Broadly stated, out invention involves preparing a hydrotropic solution containing ammonia to which an organic halide is added. The solution is then subjected to heat and pressure to cause a reaction between the ammonia and the halide to form an amine hydrohalide. After the reaction has reached practical completion, the mass is freed of excess ammonia and unreacted halide. The mass containing the hydrohalide of the amines is then causticized and the amines are recovered by distillation or by any suitable operation. That is, the amine salt may be filtered off, when its solubility is sufficiently low to warrant such procedure, and causticized, or the reaction mass freed from excess ammonia may be causticized. Of course, if desired, the excess ammonia and unreacted halide, if any, may be reused. The solubility of ethylene dichloride is only slight in water or in aqua ammonia, but by the utilization of hydrotropic solutions containing the aforesaid dichloride, or other halide, it can be brought into effective reaction contact with ammonia.

Hydrotropic solutions are those aqueous solutions which are capable of dissolving substances, particularly organic products, in excess of their normal solubility in water. Thus, nitro-benzene is almost insoluble in water, but in a saturated solution of certain organic salts, such as sodium xylenesulfonate, the solubility at 50° C. of nitrobenzene is raised to about 50 grams in 100 grams of such a hydrotropic solution. The phenomena exhibited by hydrotropic solutions are the reverse of the well known "salting out" process which is used in organic chemistry. Hydrotropic solutions are capable of "salting in" organic solutes.

For the purpose of giving those skilled in the art a better understanding of the present invention, the following illustrative examples are given:

Example No. 1

About 5.5 kilograms of 19% aqua ammonia, about 1475 grams of sodium cymene sulfonate and about 310 grams of ethylene dichloride were mixed and the resulting hydrotropic solution was introduced into a reaction vessel provided with a steam jacket or other suitable means of heating. The pressure was raised within the reaction vessel to about 85 pounds per square inch to about 105 pounds per square inch (gauge pressure) and the temperature to between about 100° C. to about 130° C. At the end of about one hour about 95% to about 100% of the halide had reacted with the ammonia.

For the purpose of comparison, a similar test was made using the same amount of materials and the same equipment except that no sodium cymene sulfonate or similar salt was used. Hence, no hydrotropic solution was formed and the reaction took place in a two phase system. The pressure was raised to about 90 to about 130 pounds per square inch (gauge pressure) and the temperature to about 115° C. At the end of about one hour approximately 35% of the halide had reacted with ammonia.

For convenience the following comparative table is given.

|  | Hydrotropic solution | | | Non-hydrotropic solution | | |
|---|---|---|---|---|---|---|
| Time, minutes | Temp., °C. | Press. lbs./ sq. in. | Percent chloride reacted | Temp., °C. | Press. lbs./ sq. in. | Percent chloride reacted |
| 0 | 27 | 0 |  | 33 | 0 |  |
| 14 | 108 | 85 | 20 | 109 | 116 | 7 |
| 15-16.5 | 108 | 87 | 22 |  |  |  |
| 19 | 121 | 95 | 36 | 116 | 127 | 10 |
| 26-27.5 | 125 | 105 | 59 | 118 | 130 |  |
| 60-65 | 125 | 98 | 100 | 115 | 124 | 35 |

In order to obtain the free ethylene diamine, the reaction mixture including the hydrotropic solution was heated to about 100° C. to drive off ammonia and was then cooled to about 40° C. The cooled mixture was made just slightly acid with sulfuric acid and a large amount of buff colored crystals of the ethylene diamine cymene sulfonate salt was precipitated. This salt was filtered off and was mixed with sodium hydroxide and distilled. Of course, any other suitable causticizing agent may be used. Water was added from time to time to compensate for that which went over with the diamine. The yield of ethylene diamine salt was about 75% of the theoretical amount based on the ethylene dichloride taken and, in addition, there were certain amounts of valuable by-products, such as diethylene triamine and triethylene tetramine.

Example No. 2

About 2 grams of amylchloride and about 4.5 grams of ammonia were dissolved in about 30 grams of concentrated sodium cymene sulfonate solution and were heated. The ratio of ammonia to halide was 15:1 mols. Approximately 10 grams of water were present. The mass was heated to about 80° C. for about 15 hours and about 90% of the materials reacted. The amines were recovered by distillation of the causticized mass after removing the excess ammonia.

Example No. 3

About 3 parts of benzyl chloride were added to a hydrotropic solution of about 20 parts sodium cymene sulfonate and about 20 parts of concentrated ammonia. After about 2 hours, a clear solution was produced. When this solution was kept at about 40° C., crystals of tribenzyl amine separated. The amount of these crystals can be increased by adding more benzyl chloride to the same solution. The crystals, on washing but without other purification, were found to be approximately pure tribenzyl-amine as shown by the melting point of 92° C. If the ratio of ammonia to benzyl chloride is low (say a molar ratio of 4:1), the yield of tribenzyl amine is about 75% of the theoretical. On the other hand, when more ammonia is used, say a molar ratio of 10:1, then the yield of tribenzyl amine decreases and dibenzyl amine becomes the main product.

Example No. 4

About 5 parts of 2,4-dinitro chlorobenzene was caused to react with ammonia in a hydrotropic solution containing about 30 parts sodium cymene-sulfonate and about 20 parts concentrated ammonia by heating at about 100° C. for about 30 minutes. On cooling and diluting to about 200 parts with water 2,4-dinitro aniline was obtained as a precipitate in good yield.

Potassium or ammonium salts of xylenesulfonic, citric or benzenesulfonic acid or benzoic acid or other hydrotropic salts may be substituted for sodium cymene sulfonate without affecting the yields of amine appreciably.

It was readily determined that very little hydrolysis of the halide occurred during the reaction.

The advantages resulting from the use of a hydrotropic solution are appreciated when it is considered that ethylene dichloride is soluble to the extent of less than 1% by weight in water while in a hydrotropic solution, such as 45% sodium cymene sulfonate, it is soluble to above 10% by weight at room temperature. Furthermore, sodium cymene sulfonate is more soluble in a concentrated ammonia solution than in that quantity of water present alone. For example, at 33° C. 100 grams of about 27% ammonia dissolve about 91 grams of sodium cymene sulfonate while the water present, i. e. about 75 grams, dissolves only about 73 grams of sodium cymene sulfonate.

It was surprising to find that ethylene diamine forms an insoluble salt with cymene sulfonic acid containing about 5.7 to about 5.8% nitrogen, a fact which aids in the recovery of ethylene diamine produced by the present process. In this connection, it is interesting to note that most of the common salts of ethylene diamine are readily soluble in water, and the same is true of the salts of cymene-sulfonic acid. Therefore, the discovery that the salt of 2 mols cymene sulfonic acid and 1 mol ethylene diamine forms a white slightly soluble precipitate was unpredictable by those skilled in the art from a priori reasoning. It was found that the salts of diethylene triamine and triethylene-tetramine and cymene sulfonic acid are quite soluble as compared with the ethylene diamine salt under the same conditions and likewise the ethylene diamine salts of xylene sulfonic and benzene sulfonic acids are not precipitated under the same conditions. Thus, this salt can be used for separating either ethylene diamine or a cymene sulfonate group from a mixture containing related substances.

Although the present invention has been described in conjunction with preferred procedures of carrying the invention into practice, it is to be understood that variations and modifications may be resorted to as those skilled in the art will readily understand. Such variations and modifications are considered to be within the purview of the specification and the scope of the appended claims. Thus the term alkyl halides is to be considered as including the halides of the aliphatic hydrocarbon having 15 or less than 15 carbon atoms such as methyl chloride, ethyl chloride, amyl chloride, butyl chloride, octyl bromide, nonyl bromide, desyl bromide and pentadecyl bromide. The classification, alkylene halides is to be considered as including ethylene dichloride, and tetradecylene dichloride. The aromatic or aryl halides are to be considered as including phenyl chloride, phenyl methyl chloride, phenyl ethyl chloride, chloronaphthalene and chloroanthracene. Among the substituted aromatic or aryl halides included in the group are chloronitrotoluene and dinitrochlorotoluene.

We claim:

1. The process of producing ethylenediamine which comprises reacting a mixture containing about 4.2 parts by weight of ethylene dichloride, about 20 parts by weight sodium cymenesulfonate and about 76 parts by weight of 19% aqueous ammonia at a temperature between about 90° C. and about 125° C. and at a pressure between about 75 and about 105 pounds per square inch, freeing said reacted mixture of unreacted ammonia, and recovering the amines thus produced.

2. The process of producing amylamine which comprises reacting a mixture containing about 2 parts by weight of amyl chloride and about 4.5 parts by weight of ammonia dissolved in a hydrotropic solution made from a salt of an aromatic sulfonic acid at a temperature of about 80° C., to about 100° C., recovering unreacted ammonia and distilling off the amines produced.

3. The process of producing tribenzylamine which comprises reacting a mixture of about 3 parts by weight of benzyl chloride, about 20 parts by weight concentrated ammonia in a hydrotropic solution containing about 20 parts by weight of sodium cymenesulfonate at a temperature of about 40° C., freeing the reaction mixture of unreacted ammonia and recovering the amines so produced.

4. The process of producing di- and tribenzylamines which comprises reacting benzyl chloride and ammonia in the proportions of about 4 mols to about 10.8 mols of ammonia per mol of benzyl chloride in a hydrotropic solution at a temperature of about 40° C., and recovering the amines so produced.

5. The process of producing amines from halides of substituted hydrocarbons which comprises reacting aqua ammonia and a hydrocarbon halide in a hydrotropic solution at a reaction temperature and recovering the amines of said hydrocarbons.

6. The process of producing ethylenediamine which comprises reacting ethylene dichloride and ammonia in the proportion of about 4.7 to about 40 mols of ammonia to one mol of ethylene dichloride in a hydrotropic solution containing sodium cymenesulfonate at a temperature of about 90° C. to about 125° C., recovering unreacted ammonia and dichloride and precipitating the ethylenediamine, so produced, in slightly acid solution.

7. The process of producing amines which comprises reacting ammonia and a halide selected from the group consisting of alkyl, alkylene and aromatic halides in a hydrotropic solution at a reaction temperature and pressure to produce a mixture of amines of said halide, distilling off unreacted halide, freeing said reaction mixture of unreacted ammonia, and recovering said amines.

8. The process of producing amines which comprises forming a reaction mixture of ammonia and a halide selected from the group consisting of alkyl, alkylene and aromatic halides in a hydrotropic solution, heating said reaction mixture to a reaction temperature to produce amines of said halide, freeing said mixture of excess ammonia and unreacted halide, causticizing said reaction mixture and recovering the amines of said halide.

9. The process of producing amines which comprises reacting a mixture containing an aliphatic halide and ammonia in the proportion of about 1 mol of halide to about 5.5 mols to about 16 mols of ammonia in a hydrotropic solution at a temperature of about 80 to about 100° C., freeing the reaction mixture of ammonia after practical completion of the reaction, recovering said excess ammonia and reusing said ammonia in the first step hereof, and recovering the amines so produced.

10. The process of producing amines which comprises forming a hydrotropic solution containing ammonia, adding a halide of a hydrocarbon selected from the group consisting of lower alkyl, alkylene and aromatic halides, heating at a reaction temperature until the reaction is substantially complete, removing excess ammonia, and recovering the amines so produced.

11. The process of producing amines which comprises reacting an organic halide selected from the group consisting of aliphatic and aromatic halides and ammonia in the ratio of one mol of halide to from 4.7 to about 40 mols of ammonia in a hydrotropic solution at a reaction temperature and pressure, freeing the reaction mixture of ammonia and unreacted halide and recovering the amines so produced.

12. The process of producing amines which comprises reacting an organic halide selected from the group consisting of alkyl, alkylene and aromatic halides with ammonia in a hydrotropic solution containing a hydrotropic agent selected from the group consisting of ammonium, potassium and sodium salts of cymenesulfonic, xylenesulfonic, citric and benzenesulfonic acids, freeing the mixture of ammonia and unreacted halide and recovering the amines so produced.

13. In the process of producing ethylene diamine the improvement which comprises recovering ethylenediamine from slightly acid solution as a substantially insoluble salt of cymenesulfonic acid.

14. In the process of producing ethylene diamine that improvement which comprises precipitating ethylenediaminecymenesulfonate from a slightly acid solution at a temperature below about 40° C.

15. In the process of producing ethylene diamine the improvement which comprises recovering ethylenediamine as a salt of cymenesulfonic acid containing about 5.7 to about 5.8% nitrogen.

16. In the process of producing ethylene diamine the improvement which comprises recovering ethylenediamine as a salt of cymenesulfonic acid containing about 5.7 to about 5.8% nitrogen from a mixture of ethyleneamines.

17. As a new article of manufacture ethylenediamine cymenesulfonate not melting even at 275° C. and containing about 5.7 to about 5.8% nitrogen and being but slightly soluble in water.

18. The process of producing amines from halides of substituted hydrocarbons which comprises reacting aqua ammonia and a halide of a nitrohydrocarbon in a hydrotropic solution at a reaction temperature and recovering the amines of said nitrohydrocarbon.

RALPH H. MCKEE.
CARL T. BAHNER.